United States Patent [19]
Menard et al.

[11] Patent Number: 4,740,342
[45] Date of Patent: Apr. 26, 1988

[54] THERMOFORMING FLEXIBLE PLASTIC FOAM SHELLS

[75] Inventors: Michael Joseph Menard, Doylestown; Philip Joseph Marbach, Doylestown, both of Pa.

[73] Assignee: Personal Products Company, Milltown, N.J.

[21] Appl. No.: 897,168

[22] Filed: Aug. 15, 1986

[51] Int. Cl.⁴ .............. B29C 67/22; B29C 51/18; B29C 51/42; B29C 51/36
[52] U.S. Cl. ............................ 264/549; 219/339; 219/348; 264/321; 425/388; 425/817 R
[58] Field of Search ........... 264/321, 549; 425/388, 425/817 R; 219/339, 348

[56] References Cited

U.S. PATENT DOCUMENTS

| | | | |
|---|---|---|---|
| 2,973,558 | 3/1961 | Stratton, Jr. .................. | 264/549 |
| 3,291,874 | 12/1966 | Negoro ........................ | 264/549 |
| 3,338,997 | 8/1967 | Tigner ......................... | 264/549 |
| 3,518,334 | 6/1970 | Carrigan et al. ............... | 264/321 X |
| 4,102,964 | 7/1978 | Ridgeway ..................... | 264/321 X |
| 4,187,621 | 2/1980 | Cohen ......................... | 264/321 X |
| 4,248,651 | 2/1981 | Kojimoto et al. .............. | 264/321 X |
| 4,360,491 | 11/1982 | Holden, Jr. ................... | 264/321 X |
| 4,538,787 | 9/1985 | Fox et al. ..................... | 264/321 X |

Primary Examiner—Philip Anderson

[57] ABSTRACT

An improved method and apparatus for rapidly forming plastic foam shells from a flexible foam sheet. The foam sheet is intermittently passed through a radiant heating unit and is rapidly heated on both sides to 130°–250° F. to soften the foam. The heated foam sheet is immediately passed through a forming die unit in which the foam sheet is deformed partly into the die cavity by withdrawal of air from the cavity, and a die plug descends and final forms a shell while rapidly cooling the foam shell to below its plastic deformation temperature. By this forming method and apparatus, ethylene-containing foam shells having a depth 10–25 times the foam sheet initial thickness are rapidly formed at 10–30 cycles/minute.

16 Claims, 8 Drawing Sheets

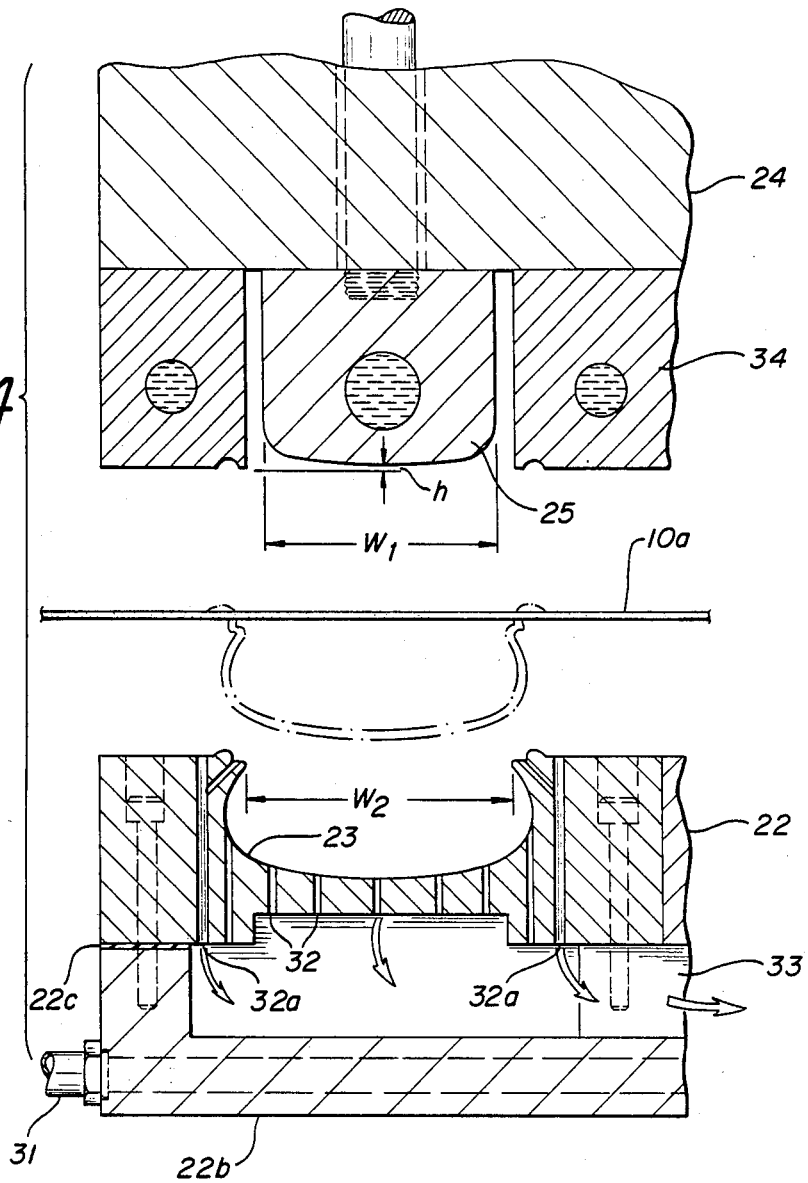

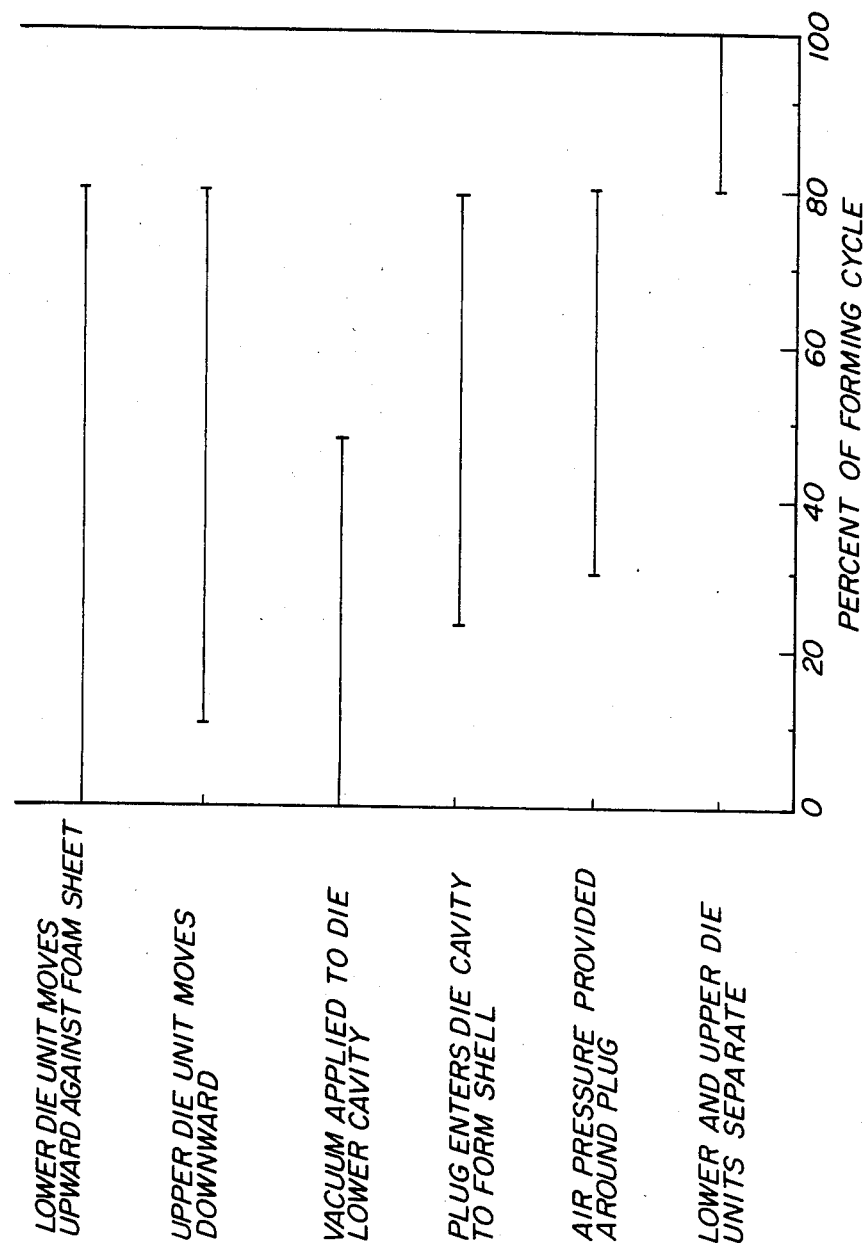

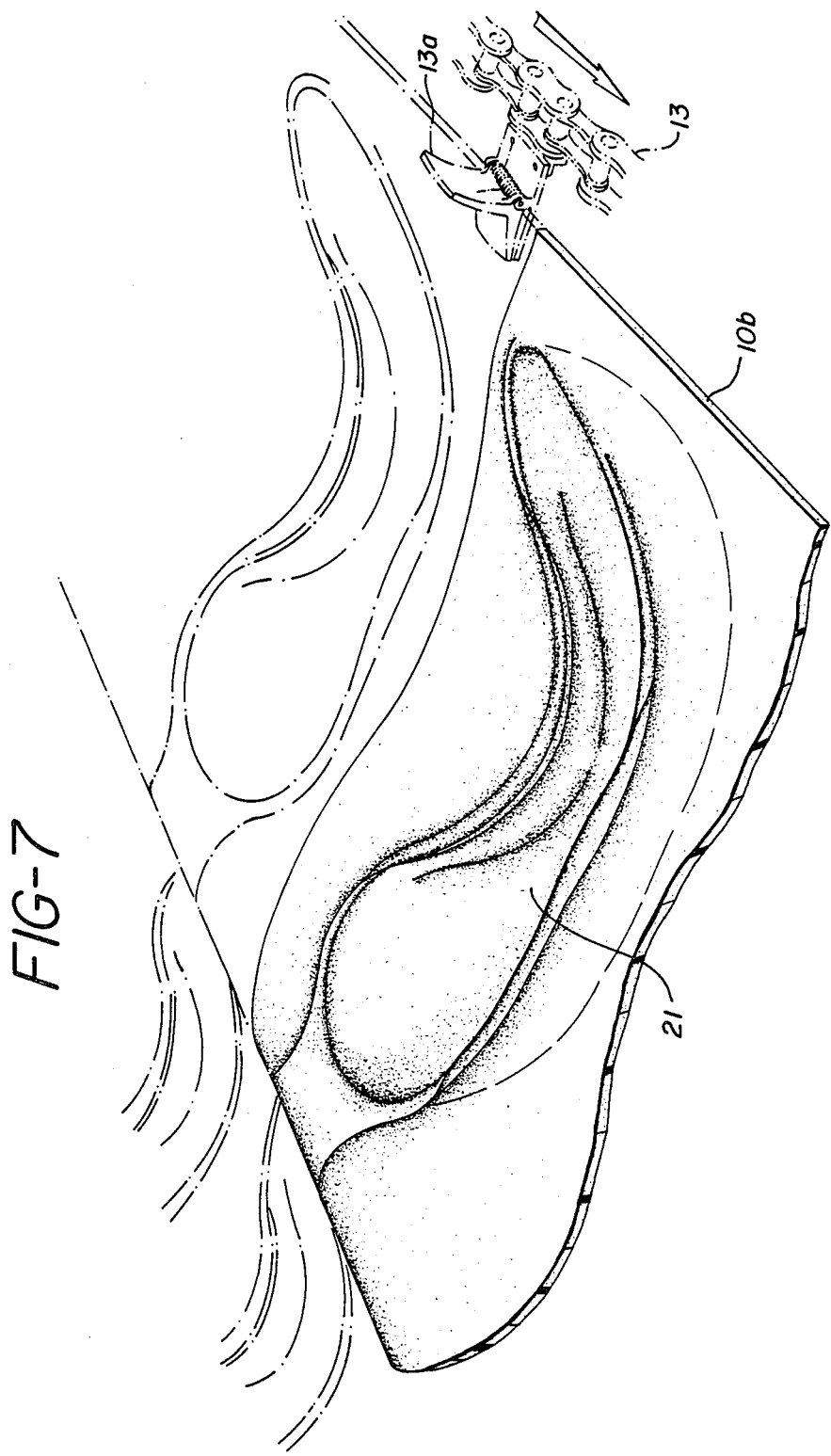

THERMOFORMING FLEXIBLE PLASTIC FOAM SHELLS

BACKGROUND OF INVENTION

This invention relates to rapid forming of flexible foam shells from ethylene-containing foam sheet materials. It relates particularly to an improved method and apparatus for rapidly heating and die forming ethylene-containing foam sheet to produce stable drawn shell shapes.

Conventional slow rate forming of plastic foam sheet materials such as polyethylene and polystyrene into various forms and shapes using vacuum forming procedures is known. However, a major problem encountered with rapidly thermoforming ethylene-containing foam sheet materials into desired shapes at rates exceeding about 10 cycles/minute is the flexibility and low heat conductivity of the material, and the time needed for the formed foam shapes to thermally stabilize after heating so as to maintain the desired formed shape. Because of a need for increased rates for producing such formed ethylene-containing foam shapes, it is necessary to achieve rapid forming and stabilization of the formed ethylene-containing foam shells, such as at least 10 forming cycles/minute and even up to 30 or more cycles/minute. However, the problems encountered with rapidly heating and forming ethylene-containing foam sheets into stable deep drawn foam shapes have been advantageously and unexpectedly overcome by the present invention.

SUMMARY OF INVENTION

This present invention provides an improved method and apparatus for rapidly forming flexible plastic foam sheet into formed shells having desired stable shapes. According to the method of the invention, a closed cell ethylene-containing polymer foam sheet material such as polyethylene having thickness of 0.050–0.250 inch, is first heated rapidly from ambient temperature to a desired forming temperature such as 130°–250° F. using dual radiant heating units. The radiant heating units each contain heating plates placed both above and below the foam sheet and sufficiently near the sheet surface to produce a rapid heating rate for the foam of at least 3° F./sec and preferably 10° F./sec and most preferably 20°–60° F./sec. Spacing between the heating plate and foam surface is 1–2 inches depending upon the heating rates and temperatures desired, with closer spacings being used for achieving the higher heating rates. The radiant heating units preferably utilize ceramic plates electrically heated by resistance elements embedded in the plates. The plastic foam sheet is moved between the upper and lower heating units and held stationary during heating and is then moved forward intermittently, with the forward indexed movements of the sheet occurring at least about 10 times per minute and up to 20 or even more times/minute.

The heated foam sheet is next passed intermittently on to an adjacent die forming assembly for rapidly forming the heated sheet into desired shell shapes each having a depth of at least about 10 times the foam initial thickness and preferably 12–25 times the foam initial thickness. Usual shell depth is about 0.70 inch and not exceeding about 2.5 inch. For the die forming step, the heated relatively flexible foam sheet is initially clamped between matched forming die units, and the foam sheet is pneumatically drawn downwardly partially into a cavity of a lower forming die unit. The mating forming plug of an upper die unit then descends and enters the die cavity, while the formed foam material is simultaneously cooled rapidly by both the die body and die plug so as to minimize thinning of the heated foam sheet during forming, and thereby produce a formed shell having a thickness at least about 30% of the foam sheet initial thickness and preferably 40–60% of the original thickness. The die body and plug are cooled by a coolant liquid circulating through flow passages provided in the die body and the plug for flow of the liquid, such as a water-ethylene glycol solution, through the die body and plug parts. The coolant temperature and spacing of the coolant flow passages are selected to maintain the die parts at a temperature of 20°–80° F. and to provide a foam cooling rate of 5°–200° F./second. Such rapid cooling rates provide rapid stabilization of the formed foam flexible shell shape to minimize thinning of the foam during forming and a permit producing the formed foam shells at rates exceeding 10 cycles/minute and preferably at 12–30 cycles/minute.

The ethylene-containing polymer foam sheet material is prepared by known procedures. One preferred formulation for the ethylene-containing polymer foam material is identified as Volara Type A, which is a crosslinked polyethylene foam manufactured and sold by Voltek, Inc., Lawrence, Mass. The expression "ethylene-containing polymer foam" used herein includes polyethylene homopolymer and ethylene-containing copolymers, preferably containing a major portion, by weight, of ethylene. It is preferred that the polymer present be crosslinked. Preferred comonomers, for preparing the polymers, include vinyl acetate, acrylic and methylacrylic acids and esters, such as ethyl acrylate. Blends of such polymers can also be used.

More specifically, the present invention provides a method for producing formed foam shells in an ethylene-containing foam sheet material, and includes providing a closed cell ethylene-containing foam sheet having thickness of 0.050–0.250 inch; radiant heating the foam sheet rapidly to a temperature of 130°–250° F.; and then die forming a central portion of the heated foam sheet to produce a desired concave shaped shell while rapidly cooling the shaped foam to below its plastic transition temperature by contact with the cooled forming die, so as to produce a shaped shell within the foam sheet having a depth at least about 10 times the foam initial thickness and a thickness at least about 30% of the sheet original thickness. The formed shell preferably has a depth of 12–25 times the foam sheet initial thickness and a thickness 40–60% of the sheet initial thickness. The foam heating and forming steps are accomplished at 10–30 cycles/minute.

The foam sheet is moved intermittently and simultaneously first through the heating step and then through the die forming step. The foam sheet is heated rapidly in two or three successive stages, the foam being heated to 130°–200° F. in a first stage then heated to 200°–250° F. in a final heating stage. The foam sheet heating is performed by radiant heating surfaces located on each side of the foam sheet and maintained at 400°–700° F. temperature, and the foam heating rate is 3°–60° F./sec. The plastic foam is cooled in the mating die units at a rate of 5°–200° F./sec to rapidly stabilize the foam and minimize thinning during the die forming. The die forming step includes withdrawing air from below the strip to partially deform the strip into the die cavity, followed by plug drawing the heated foam downwardly and pressurizing the foam shell around the plug to additionally provide lateral pressure forming of the foam material into the die cavity.

This invention also provides a heating assembly for radiantly heating a foam sheet which is intermittently moved between the heaters. The heating assembly includes an upper heating unit containing a heating plate element aligned substantially parallel with the foam sheet, the ceramic plate being heated by an electrical resistance element; and a lower heating unit containing a radiant heating plate aligned substantially parallel with the foam sheet, whereby the foam sheet can be moved between the upper and lower heating units for rapidly heating the sheet.

This invention additionally provides a forming die assembly for rapidly forming a foam sheet, which assembly includes a lower die unit containing at least one cavity, said die unit having flow passages provided therein for flowing a fluid through the unit to cool the die unit, said cavity having a plurality of passages intersecting the cavity surface and conduit means connected to the passages intersecting said die body cavity for withdrawing air from the cavity; an upper die unit including a frame member adapted for clamping the foam sheet against the lower die unit; and a plug incorporated into the upper die unit and shaped for mating closely within the cavity of the lower die unit, said plug containing flow passages for flowing a coolant fluid through the plug to cool the plug and the foam being formed, whereby a foam sheet passed between the lower and upper die units is deformed downwardly by air withdrawal from the lower die cavity and further formed between the mating body cavity and plug member while the sheet is being rapidly cooled to below its plastic transition temperature, so as to provide a stable formed shell shape within the foam sheet. The upper die unit is adapted to admit pressurized air adjacent the plug during forming the sheet so as to laterally form ridges in the sides of a formed foam shell. The lateral clearance between the upper clamping frame and the lower mating die unit is 0.010-0.090 inch and the clearance between the plug and mating die cavity is 0.040-0.560 inch. The lower die unit and upper die unit contain 2-6 parallel cavities and mating plugs arranged in a close parallel arrangement.

The foam heating unit and die forming unit are arranged to form at least two adjacent plastic foam shells at each die stroke between the intermittent indexing movement of the foam sheet, and can be advantageously constructed to form four to ten shells at each die stroke. The resulting formed plastic foam shells are retained integrally attached at their perimeters to the boundary sheet, for subsequent cut-out of the shells from the sheet as desired.

BRIEF DESCRIPTION OF DRAWINGS

This invention will be further described with reference to the following drawings, in which:

FIG. 4 shows a partial cross-sectional view of a matched forming die unit before clamping the foam sheet therebetween;

FIG. 6 is a timing sequence diagram for the die forming steps according to the invention; and FIG. 7 shows a perspective view of the resulting formed foam shell integrally attached to the surrounding foam sheet.

DETAILED DESCRIPTION OF INVENTION

Figure 1:
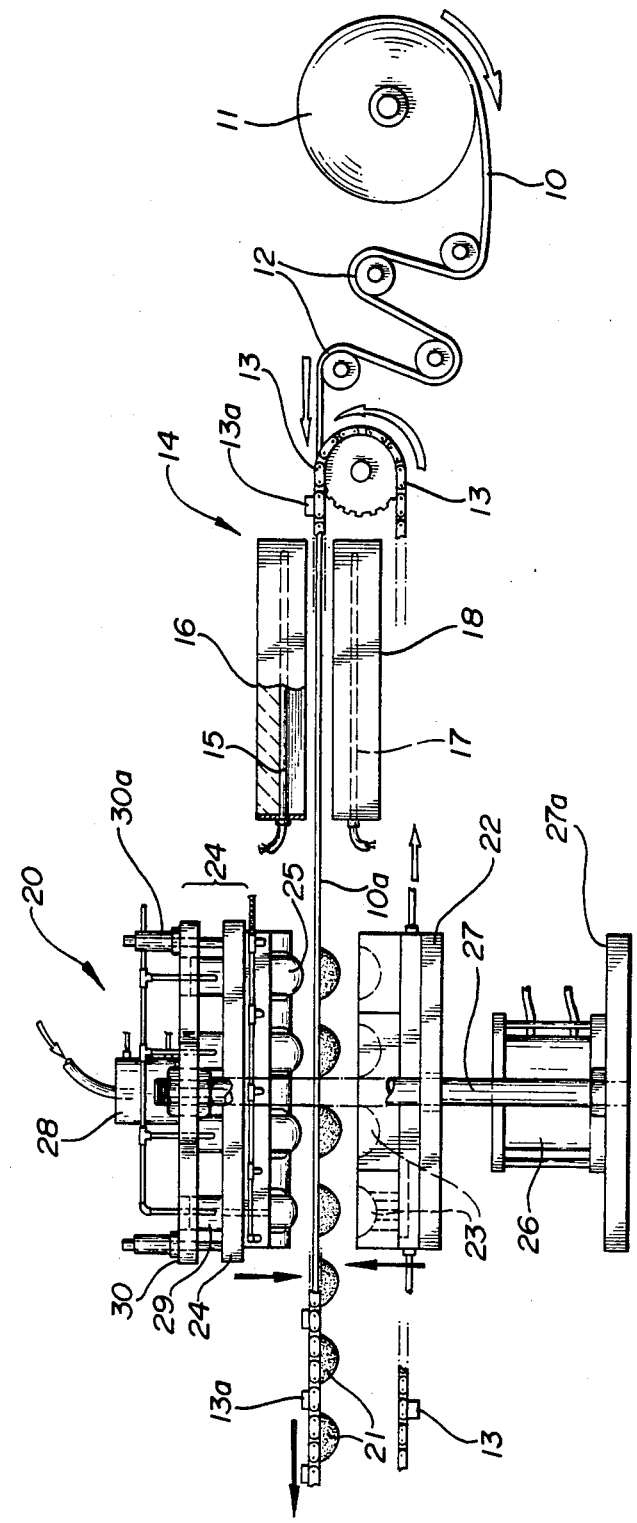
FIG. 1 shows a schematic elevation view of the foam sheet being moved through a heating section and a die forming section for producing formed plastic foam shells in accordance with the invention.

As generally depicted schematically in FIG. 1, an ethylene-containing foam material sheet 10, which has a thickness of 0.050-0.250 inch and preferably 0.060-0.200 inch, is provided from supply roll 11. The sheet is fed over control rollers 12 onto a moving conveyor chain 13 having side clamps 13a for clamping and stabilizing the edges of the foam sheet. The sheet 10 is moved by the conveyor 13 through a heating section 14, which includes dual radiant heating units 16 and 18 which are located above and below the sheet, respectively. The dual heater units rapidly heat the foam sheet 10 from ambient temperature to 130°-250° F. while it is passed intermittently between the units.

The heater units 16 and 18 are each provided with a heating plate 15 and 17 respectively, composed of a heat resistant electrically insulating material such as alumina, ceramic or quartz about 0.250 inch thick. Each plate is heated to the desired temperature by electrical resistance elements embedded in grooves in the rear sides of the ceramic plate. Spacing between the heating plates 15 and 17 and the foam sheet 10 should be at least about 1 inch for practical construction reasons, and usually should not exceed about 2 inches to achieve desired heating rates of 3°-60° F./sec for the foam sheet. The heating units 16 and 18 are usually sized to heat at least a length portion of the foam sheet equal to the portion being die formed, i.e. the heaters have a total length at least equal to the foam sheet indexed length.

Figure 2:
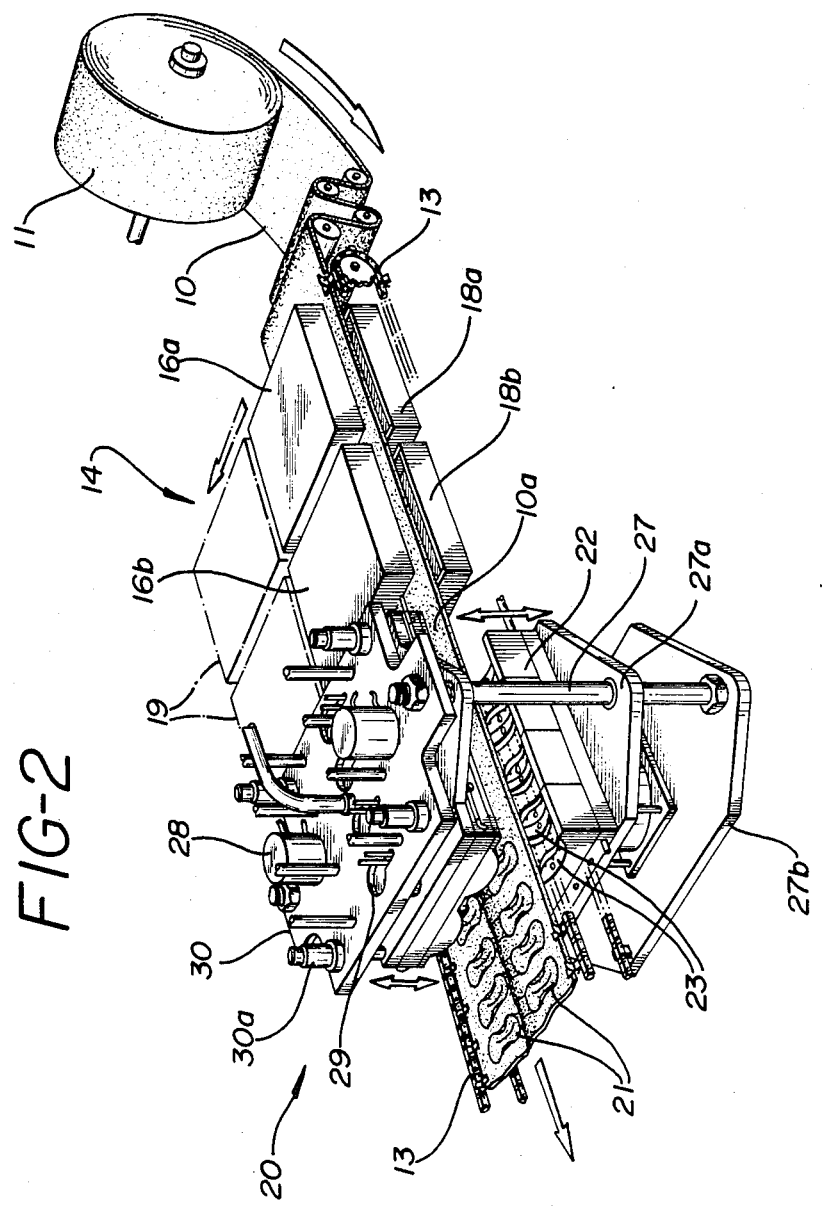
FIG. 2 shows a perspective view of the heating units located above and below the foam sheet for rapidly heating the sheet, and also shows the forming die assembly provided above and below the foam sheet for heating and die forming the formed plastic shells.

As further shown in perspective view by FIG. 2, the foam heating is usually provided by staged infrared heating units arranged in series along the length of the foam sheet 10, with the first stage units 16a, 18a being adapted for heating the foam sheet from ambient to an initial temperature of about 130°-200° F., and the second stage heating units 16b, 18b adapted for heating the foam to a higher temperature such as 200°-250° F. It has been found that infrared radiant heating at wave lengths of 3 to 6 microns provides for rapid and advantageous heating of the ethylene-containing closed cell foam material sheet. The heating units 16 and 18 are each suitably supported above and below the foam sheet 10 by a transverse support frame, so that whenever the regular intermittent forward movement of the foam sheet is interrupted for any reason, the heater units are both moved aside to position 19 as shown to avoid any prolonged excessive heating and possible thermal damage to the adjacent plastic foam sheet.

After radiant heating the foam sheet 10, it is passed onward to a die forming section 20 provided closely adjacent to the foam heating section 14, so that the heated foam sheet 10a is formed into desired shaped shells 21 integrally attached to the sheet by the die forming section 20, as generally shown by FIGS. 1 and 2. The die forming station 20 for the heated foam sheet 10a includes a lower die unit 22 containing multiple formed cavities 23 and an upper die unit 24 having multiple plugs 25 in a parallel arrangement adapted to mate closely with the lower die cavities 23. As generally shown by FIG. 2, at least two mating die sets are preferably provided arranged laterally in end-to-end relation across the width of the foam sheet, and preferably 4–10 die sets are provided in 2 or 3 parallel rows extending along the length of foam sheet 10, as generally shown in FIG. 2.

The lower die unit 22 is adapted to be vertically movable upwardly by a piston device 26 and is guided by dual vertical guide rods 27, and support plate 27a so that the die unit upper surface contacts the lower side of foam sheet 10a. The piston device 26 includes a stabilizing mechanism (not shown) which positions the lower die unit 22 rigidly so as to withstand the downward forming force of the upper die unit 24. Upper die unit 24 is supported from an upper stationary plate 30 attached to dual rods 27, and is adapted to be vertically movable downwardly by piston means 28 and guided by rods 30a so as to clamp heated foam sheet 10a against the lower die member 22. Then the plug members 25 descend further by action of plug pistons 29 to interfit with the lower die cavities 23 and form the foam shells 21 integrally attached to sheet 10a. The upper die unit 24 is supported by the stationary upper support plate 30 so that die unit 24 is vertically movable relative to the upper plate 30, while being closely guided by vertical guide rods 30a. Vertical alignment between upper die unit 24 and lower die unit 22 is maintained by the dual vertical guide rods 27 which are anchored by base plate 27b.

Figure 3:
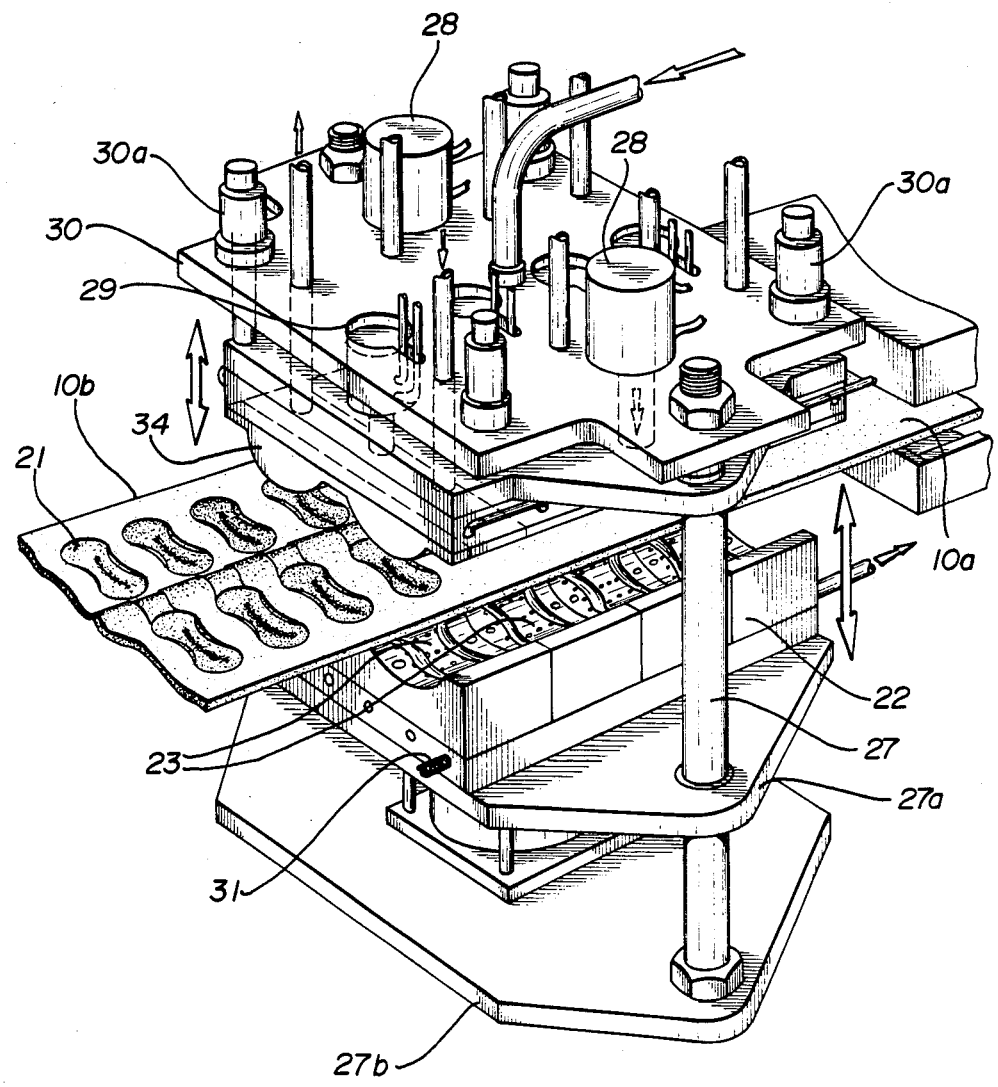
FIG. 3 shows a detailed perspective view of the die forming assembly.
Figure 5A:
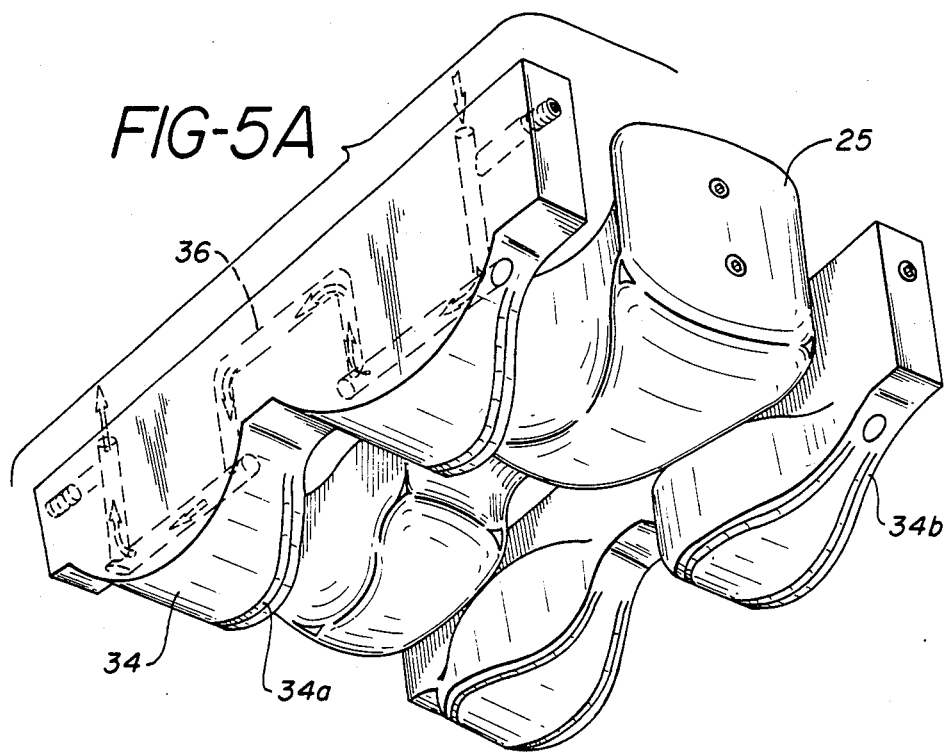
FIG. 5A shows a perspective view of the lower side of the upper forming die unit including the clamping frame and plug member, and shows the cooling passages provided therein.
Figure 5:
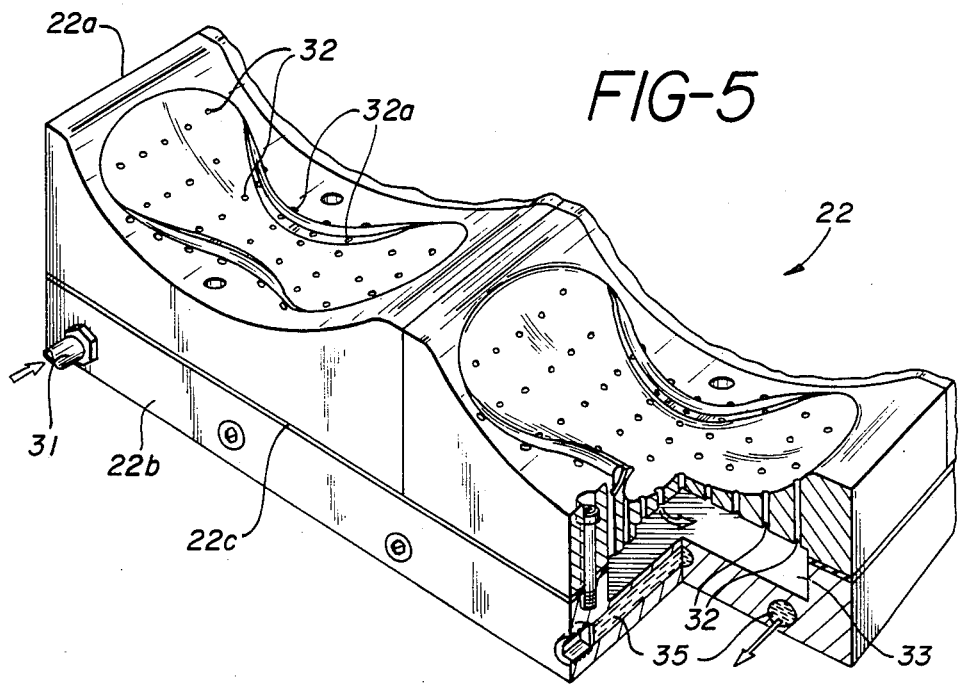
FIG. 5 shows a perspective view of the lower die unit and cavities showing the vacuum and cooling passages provided within the die unit.

The forming die assembly 20 is shown in greater detail by the perspective views of FIGS. 3, 5, and 5A. The lower die unit 22 is provided with connections 31 for coolant flow in and out of the die body 22b and for vacuum connections 32 to the cavities 23. Also, the upper support plate 30 contains connections necessary for coolant flow through the plug member(s) 25, and air flow to the pneumatic pistons 28 for moving upper die unit 24 and to piston 29 for moving the plugs 25 relative to upper die unit 24.

Figure 4A:
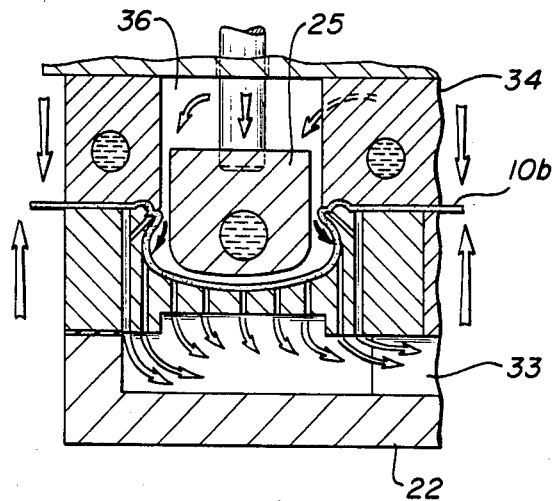
FIGS. 4A, 4B, and 4C show other cross-sectional views of the forming die unit during successive stages of the shell forming steps.
Figure 4B:
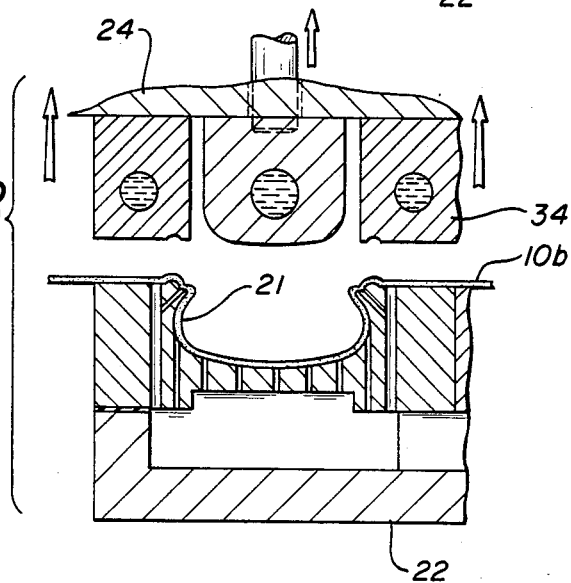
Figure 4C:
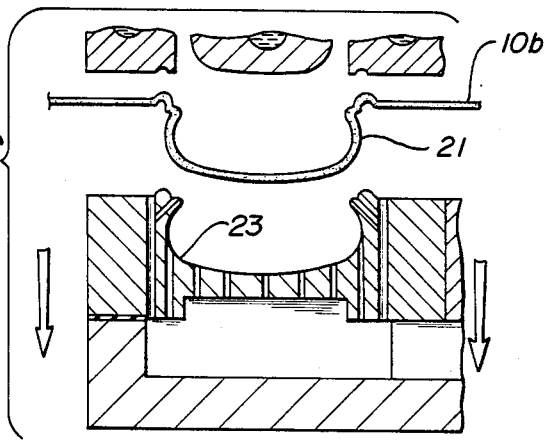

After the heated foam sheet is advanced intermittently to the die forming station, the forming die operates in a four-step procedure. The configuration and operation of the mating forming die assembly 20 is additionally described in cross-sectional view by FIG. 4. First, the lower die member 22 containing cavity 23 is moved upwardly against the foam sheet 10a, and the sheet is initially drawn downwardly partially into the cavity in the die body by vacuum pressure applied at passages 32 and 32a. Next, the upper die member 24 which includes inner plug member 25 and outer frame member 34 descends and outer portion 34 closes to clamp the foam sheet 10a against the lower die body 22. Then plug 25 which is initially positioned above the lower edge of frame member 24b by a distance "h", descends to force the heated partially formed foam material into the die cavity 23, as shown by FIG. 4A. The plug 25 is cooled to 30°–70° F. to maintain a sufficient temperature difference between the plug and heated foam sheet 10a so as to rapidly cool the foam and stabilize it to avoid excessive thinning of the foam sheet during the drawing step. Also, pressurized air is introduced at 36 around the plug 25 to force the foam laterally outwardly against the walls of the die cavity 23 to further form the side ridges 21a of the shell 21. After a brief pause of 0.5–4 second for cooling and stabilizing the formed plastic shells 21, the upper die unit 24 is withdrawn vertically away from the formed shells 21 in sheet 10b, as shown by FIG. 4B. Also the lower die member 22 is withdrawn downwardly from the sheet 10b and shell 21, as shown by FIG. 4C. The foam sheet 10b carrying shells 21 integrally formed therein is then intermittently moved forward between die assembly 20 and the forming process steps are repeated as desired.

The mating members of the forming die assembly 20 are closely matched to provide adequate dimensional control for the formed foam part, as is shown by FIGS. 4 and 4A. The total clearance between the die flange should not exceed about 0.090 inch and is preferably 0.010–0.080 inch. Total clearance between the cavity and plug should not exceed 0.60 inch and are preferably 0.040–0.560 inch.

The lower forming die unit 22 is further shown in perspective view by FIG. 5, which shows a preferred shape for die cavity 23 to form a particular desired shape shell product. The die cavity 23 in die element 22a contains small diameter holes or passages 32 uniformly located within the cavity and passages 32a located along longitudinal edges of the cavity to provide for partially drawing the foam sheet by vacuum pressure into the cavity. The die bodies 22a are each removably bolted to lower plate 22b and sealed by gasket 22c to permit replacement as needed. Also, flow passages 35 are provided for coolant flow through base member 22b to cool the die unit 22.

The clamping frame and plug members of the upper die unit 24 are shown in lower perspective view by FIG. 5A. The outer clamping die frame member 34 containing grooves 34a descend and contact the foam sheet first to stabilize the sheet, after which shaped plug member 25 descends and interfits cavity 23 to form and rapidly cool the shells 21. Outer frame member 34 contains a flow passage 36 for passing a coolant liquid through the frame to effectively cool the surfaces, and, a similar shaped flow passage 37 is provided in plug 25 for passing a coolant through the plug to cool its surfaces.

Thus, both the die body 22 and the die plug 26 are provided with internal flow passages through which a coolant liquid is circulated to cool these die parts to about 40°–60° F.

Therefore, the forming die plug 25 is inserted into the die body cavity 23 for forming the heated foam, and the resulting formed foam shell is rapidly cooled to below its plastic temperature so that it takes a permanent set. It has been found that the foam cooling rate in the shell region should be at least about 10° F./sec and preferably 5°–200° F./sec, so as to provide adequate stabilization of the foam to minimize thinning and produce shells having thickness at least about 30% of the foam initial thickness and achieve shell forming rates of 10–30 cycles per minute.

The timing sequence required for the die forming steps for forming the foam shells is shown by the FIG. 6 diagram, and is described as follows:

Step 1. Move the lower die unit upward to contact the foam sheet, after which the upper die unit frame descends and clamps the foam sheet between the two die mating units.

Step 2. Apply vacuum pressure to the lower die unit and draw the foam sheet downwardly partially into the die cavity.

Step 3. A cooled plug member of the upper die unit descends and cools the foam while further forcing the heated foam material downwardly into the lower die cavity, while air pressure is simultaneously applied around the plug to force the foam laterally outwardly into all portions of the die cavity.

Step 4. After a brief pause of about 1 second to permit cooling and stabilizing the formed foam sheet by the cooled plug and lower die unit, both lower and upper die units are withdrawn from the foam sheet substantially simultaneously, and the formed sheet is indexed forward, and the die forming sequence is repeated as desired.

A preferred shell shape formed integrally within foam sheet 10 is shown in perspective by FIG. 7. The edges of the foam sheet are retained by clips 13a attached to conveyor 13. The formed shells have dimensions of 6–12 inches length, 2–5 inches width and meximum depth of 0.5–2.5 inches.

After the multiple shell shapes have been thus formed in the foam sheet and the sheet intermittently moved forward, the resulting formed shells may then be cut apart from the foam sheet depending on the subsequent production steps desired.

This invention will be further described by the following examples of heating and forming die units, which should not be construed as limiting the scope of the invention.

EXAMPLE 1

A closed cell polyethylene foam elongated sheet 0.125 inch thick and 16 inch wide is gripped along its edges by clips attached to a conveyor chain and passed between dual radiant heating units located above and below the sheet. Each heating unit contains an electrically heated ceramic plate spaced above or below the foam strip. Performance characteristics for the heating units are as follows:

| | |
|---|---|
| Heater spacing from foam sheet, in. | 1.5 |
| Heater temperature, °F. | 500 |
| Foam sheet heated temperature, °F. | 150 |
| Foam sheet heating rate, °F./sec | 30 |

EXAMPLE 2

The heated foam sheet is passed forward to an adjacent die forming assembly, including a lower die unit provided with dual cavities and an upper die unit having dual plugs which each interfit with the lower die cavities. Both die units are cooled by a coolant liquid circulated through flow passages provided in the die units. A central portion of the foam sheet is first withdrawn partly into each die cavity by vacuum pressure, after which the upper die unit descends and closes together to clamp the foam therebetween. Then the plug descends and deforms the heated flexible foam downwardly into the die cavity while cooling the foam sheet by contact with both the die parts. Substantially simultaneously with the plug descent, pressurized air is injected into a clearance space between the plug and the deformed foam sheet to force the foam sheet laterally into side grooves of the die cavity to form a shell. Then after a brief 0.5 sec. pause to permit further cooling and dimensional stabilization of the formed foam shell, the die units are separated and the formed sheet containing the formed shell is moved intermittently forward and the forming step is repeated.

Important performance characteristics for the die assembly are as follows:

| | |
|---|---|
| Foam sheet temperature, °F. | 150 |
| Die cavity wall temperature, °F. | 50 |
| Die plug temperature, °F. | 70 |
| Foam shell cooling rate, °F./sec | 50 |
| Ratio maximum shell depth to foam sheet original thickness | 15 |
| Ratio shell min. thickness to foam sheet thickness | 0.4 |
| Clearance between upper clamping frame and lower die, in. | 0.090 |
| Lateral clearance between plug and die cavity, in. | 0.060 |

A formed shell produced has dimensions of 4 inches wide by 7.5 inches long and 1 inch deep.

Although this invention has been described broadly and in terms of a preferred embodiment, it will be apparent that modifications and variations may be made within the scope of the invention, which is defined by the following claims.

We claim:

1. A method for producing a formed foam shell in an ethylene-containing foam sheet material, the method comprising:
   (a) providing a closed cell ethylene-containing foam sheet having an initial thickness of 0.050–0.250 inch;
   (b) rapidly radiant heating said foam sheet to a temperature of 130°–250° F.; and
   (c) die forming a central portion of the heated foam sheet to produce a desired concave shaped shell having a depth at least about 10 times the foam initial thickness, said die forming being performed by cooperating die units having mating sheet engaging shaped surfaces and effecting relative movement between said die units to bring said shaped surfaces into engagement with said sheet and into mating relationship with one another, rapidly cooling the shaped foam material to below its plastic transition temperature during the die forming by contacting the sheet with a forming die unit which is cooled to below the heated foam temperature, so as to produce a stable shaped shell within a central portion of the foam sheet in a heating and die forming cycle time of 2–6 seconds, said shell having a thickness at least about 30% of the foam sheet initial thickness.

2. The method of claim 1, wherein said foam sheet heating is performed by intermittently moving the sheet between adjacent radiant heating surfaces, said heating surfaces being located on each side of the foam sheet, and maintained at 400°–700° F. temperature, so as to produce a foam sheet heating rate of 3°–60° F./sec.

3. The method of claim 1, wherein said foam sheet heating is performed in 2 or three successive steps, the foam sheet being heated to 130°–200° F. in a first heating step, then successively heated to 200°–250° F. in a final heating step.

4. The method of claim 1, wherein the heated foam sheet is intermittently moved and clamped between the forming die unit which stabilizes the shell edges, and the die unit includes a body and plug which are cooled by circulating a coolant through flow passages therein while forming the concave shaped shell within the foam sheet.

5. The method of claim 1, wherein the die formed shell has a depth 12–25 times the initial thickness of the foam sheet material.

6. The method of claim 1, wherein said die forming step includes withdrawing air from below the foam sheet to partially deform the sheet into a lower cavity of the forming die unit, plug forming the foam sheet further downwardly, and air pressurizing the foam concave shape around the plug to provide additional lateral forming of the foam sheet into the die unit lower cavity.

7. The method of claim 1, wherein said heated foam sheet is cooled in the forming die unit at rate of 5°–200° F./second.

8. The method of claim 1, wherein the foam sheet material is a closed cell polyethylene having initial thickness of 0.060–0.200 inch.

9. The method of claim 1, wherein 2–10 formed foam shells are produced simultaneously from the foam sheet.

10. A method for producing formed foam shells in an ethylene-containing foam sheet material, the method comprising:
(a) providing a closed cell polyethylene-containing foam sheet having an initial thickness of 0.060–0.200 inch;
(b) moving said foam sheet intermittently between adjacent radiant heating surfaces and radiant heating the foam sheet from ambient temperature to 130°–250° F. at a heating rate of 3°–60° F./sec.;
(c) clamping the heated foam sheet between matched forming die units to stabilize the sheet edges, said die units including a cooperating die unit plug portion and a die unit body portion having mating sheet engaging shaped surfaces, and die forming the heated foam shell sheet by effecting relative movement between said die units to produce a desired concave shaped shell having a draw depth about 12–25 times the initial thickness of the foam sheet, while simultaneously rapidly cooling the die unit plug portion to stabilize the heated foam material during the die forming step and thereby maintaining the formed shell thickness at least about 30% of the foam sheet initial thickness;
(d) pressurizing the foam concave shape around the plug to additionally form the foam sheet laterally within the die unit lower cavity; and
(e) cooling the die unit body and the plug portions so as to cool the foam sheet at 5°–200° F./sec. to stabilize the formed foam shell, and thereby produce a plurality of shaped foam shells within a central portion of the foam sheet, whereby the foam sheet heating and die forming steps are accomplished at 10–30 cycles/minute.

11. A heater assembly for radiantly heating a foam sheet intermittently moving along a processing path, the assembly comprising:
(a) an upper heating unit containing a ceramic plate aligned parallel with and located 1–2 inches above the foam sheet processing path, said ceramic plate being heated by an adjacent electrical resistance element mounted above the plate;
(b) a lower heating unit containing a ceramic plate aligned parallel with and located 1–2 inches below the foam sheet processing path, said ceramic plate being heated by an adjacent electrical resistance element mounted below the plate, whereby the foam sheet can be moved between the upper and lower heating units for rapid heating of the sheets from both sides thereof; and
(c) support means adapted for moving said upper and lower heating units aside whenever intermittent movement of the foam sheet is interrupted, whereby heating of the foam sheet can be interrupted.

12. A forming die assembly for rapidly forming a foam sheet, comprising:
(a) a lower die body containing at least one cavity, said body having flow passages provided therein for flowing a fluid through the body to cool the die body, said cavity having a plurality of passages intersecting the cavity surface;
(b) conduit means connected to said passages intersecting said die body cavity for withdrawing air from the cavity;
(c) an upper die unit including a frame adapted for clamping the foam sheet against the lower die body; and
(d) a plug incorporated into said upper die unit and shaped for mating closely within the cavity of said lower die body, said plug containing flow passages therein for flowing a coolant fluid through the plug to cool the plug, whereby a foam sheet passed between the lower die body and upper die body is deformed downwardly by air withdrawal from the lower die cavity and further formed between the mating body cavity and plug while the sheet is being cooled to below its plastic transition temperature to provide a stable formed shell shape within the foam sheet.

13. A forming die assembly according to claim 12, wherein said upper die body is adapted to admit pressurized air adjacent said plug so as to pneumatically form ridges in the sides of a formed plastic foam shell.

14. A forming die assembly according to claim 12, wherein said lower die body and upper die unit contain 2–6 parallel cavities and mating plugs provided in a close parallel arrangement.

15. A forming die assembly according to claim 12, wherein the lateral clearance between said upper clamping frame and the mating lower die unit is 0.010–0.090 inch, and the clearance between said cavity and the mating plug is 0.040–0.560 inch.

16. A forming die assembly for rapidly forming a foam sheet, said assembly comprising:
(a) a lower die unit containing at least one cavity, said unit having flow passages provided therein for flowing a fluid through the die body to cool the die body, said cavity having a plurality of small passages intersecting the cavity surface;
(b) conduit means connected to said passages intersecting said die body cavity for withdrawing air from the cavity;
(c) an upper die unit including a frame member adapted for clamping the foam sheet against the lower die body, wherein the clearance between the clamping frame and the mating lower die body is 0.010–0.090 inch; and (d) a die plug incorporated into said upper die unit and shaped for mating closely within the cavity of said lower die body, said plug containing flow passages therein for flowing a coolant fluid through the plug to cool the plug wherein said upper die body is adapted to admit pressurized air adjacent the plug so as to pneumatically form ridges in the sides of a formed plastic foam shell, and the clearance between the plug and the mating lower die cavity is 0.040–0.560 inch; whereby a foam sheet passed between the lower die body unit and upper die unit is deformed downwardly by air withdrawal from the lower die cavity and further formed between the mating body and plug parts, while the sheet is being rapidly cooled to below its plastic transition temperature to provide stable formed shell shapes.

* * * * *